(12) United States Patent
Datlen et al.

(10) Patent No.: US 12,313,488 B2
(45) Date of Patent: May 27, 2025

(54) THERMAL INSULATION SYSTEM FOR A CAPACITANCE DIAPHRAGM GAUGE

(71) Applicant: Sumitomo (SHI) Cryogenics of America, Inc., Allentown, PA (US)

(72) Inventors: Matt E. Datlen, Carson City, NV (US); Kurt R. Rustin, San Diego, CA (US); Nathaniel S. Hankel, Lemon Grove, CA (US); Shawn C. Brown, Menifee, CA (US)

(73) Assignee: Sumitomo (SHI) Cryogenics of America, Inc., Allentown, PA (US)

( * ) Notice: Subject to any disclaimer, the term of this patent is extended or adjusted under 35 U.S.C. 154(b) by 457 days.

(21) Appl. No.: 18/059,845

(22) Filed: Nov. 29, 2022

(65) Prior Publication Data

US 2023/0175907 A1    Jun. 8, 2023

Related U.S. Application Data

(60) Provisional application No. 63/285,774, filed on Dec. 3, 2021.

(51) Int. Cl.
*G01L 9/12* (2006.01)
*G01L 19/04* (2006.01)

(52) U.S. Cl.
CPC .............. *G01L 9/125* (2013.01); *G01L 19/04* (2013.01)

(58) Field of Classification Search
CPC .................. G01L 9/125; G01L 9/00–18; G01L 19/00–16
See application file for complete search history.

(56) References Cited

U.S. PATENT DOCUMENTS

| 5,625,152 A | * | 4/1997 | Pandorf ................ G01L 9/0072 |
| | | | 73/756 |
| 5,808,206 A | | 9/1998 | Pandorf et al. |

(Continued)

FOREIGN PATENT DOCUMENTS

| CN | 1178005 A | 4/1984 |
| CN | 101254579 A | 9/2008 |

(Continued)

OTHER PUBLICATIONS

Lee, Hun Gil (Authorized Officer of KIPO), "Written Opinion of the International Searching Authority," Aug. 30, 2022, 5 pages.

(Continued)

*Primary Examiner* — Nathaniel J Kolb
(74) *Attorney, Agent, or Firm* — Patterson Intellectual Property Law, P.C.; Jerry Turner Sewell

(57) ABSTRACT

A capacitance diaphragm gauge (CDG) assembly includes a CDG sensor positioned within a vacuum enclosure, which is maintained at a vacuum. The CDG sensor generates sensor signals responsive to a pressure of an applied gas. The vacuum enclosure provides thermal insulation around the CDG sensor. The CDG sensor is maintained at a selected operating temperature using an internal heater positioned on the CDG sensor. The internal heater is responsive to external heater control signals. The temperature of the CDG sensor is monitored using an internal temperature sensor mounted on the CDG sensor. The temperature sensor generates a temperature signal. The vacuum enclosure includes an end cap that seals the vacuum enclosure. Connectors positioned through the end cap communicate the sensor signals, the heater control signals and the temperature signals through the end cap. The connectors are hermetically sealed to the end cap to maintain the vacuum within the vacuum enclosure.

19 Claims, 8 Drawing Sheets

(56) References Cited

U.S. PATENT DOCUMENTS

| | | | |
|---|---|---|---|
| 6,029,525 A * | 2/2000 | Grudzien | G01L 9/0072 73/718 |
| 6,588,280 B1 * | 7/2003 | Quigley | G01L 9/125 73/708 |
| 7,124,640 B1 | 10/2006 | Miller et al. | |
| 7,201,057 B2 | 4/2007 | Agami | |
| 2002/0083774 A1 | 7/2002 | Poulin et al. | |
| 2009/0114029 A1 | 5/2009 | Ide | |
| 2010/0186516 A1 | 7/2010 | Hanselmann et al. | |
| 2012/0197554 A1 | 8/2012 | Glaudel et al. | |
| 2018/0238756 A1 | 8/2018 | Ishihara et al. | |
| 2022/0090974 A1 | 3/2022 | Datlen et al. | |

FOREIGN PATENT DOCUMENTS

| | | |
|---|---|---|
| CN | 103929925 A | 7/2014 |
| CN | 203848247 U | 9/2014 |
| CN | 109141739 A | 1/2019 |
| JP | 3100986 B2 | 8/2000 |
| JP | 3334888 B2 | 10/2002 |
| JP | 2004-506890 A | 3/2004 |
| JP | 4437336 B2 | 3/2010 |
| JP | 4988732 B2 | 5/2012 |
| JP | 2014-126503 A | 7/2014 |
| JP | 5576331 B2 | 7/2014 |
| KR | 10-2021-0101328 | 5/2021 |
| WO | 0214821 A2 | 2/2002 |
| WO | 2007008388 A1 | 1/2007 |
| WO | 2020176495 A1 | 9/2020 |

OTHER PUBLICATIONS

Lee, Hun Gil (Authorized Officer of KIPO), "International Search Report," Aug. 30, 2022, 3 pages.

Lee, Sun Hwa (Authorized Officer of KIPO), "International Preliminary Report on Patentability," Jun. 13, 2024, 7 pages.

* cited by examiner

THERMAL INSULATION SYSTEM FOR A CAPACITANCE DIAPHRAGM GAUGE

RELATED APPLICATION

This application claims the benefit of priority under 35 USC 119(e) to U.S. Provisional Application No. 63/285,774, filed Dec. 3, 2021, entitled "Thermal Insulation System for a Capacitance Diaphragm Gauge," which is hereby incorporated by reference in its entirety.

FIELD OF THE DISCLOSED EMBODIMENTS

The subject matter of the present application is in the field of capacitance diaphragm gauge (CDG) sensors for measuring pressures.

BACKGROUND OF THE DISCLOSED EMBODIMENTS

The present disclosure relates generally to an insulated capacitance diaphragm gauge (CDG) sensor for measuring pressure. Such a CDG sensor could be used, for example, to monitor the manufacturing process of semiconductors and other high temperature environments that require precise pressure measurements.

Absolute CDG sensors measure pressure by sensing the capacitance change associated with deflection of a diaphragm whereby one side (the pressure side) of the diaphragm is exposed to the pressure to be measured and the other side of the diaphragm is exposed to a sealed reference vacuum cavity in which an ultrahigh vacuum (e.g., less than $10^{-9}$ Torr) has been created prior to the sealing of the reference cavity.

The CDG sensor measures capacitance between a diaphragm and one or more fixed electrodes housed in the reference vacuum cavity. When the pressure on the pressure side of the diaphragm is higher than the pressure in the reference vacuum cavity, the diaphragm deflects in the direction of the fixed electrode (or electrodes), which increases the measured capacitance. As the pressure on the pressure side of the diaphragm decreases, the pressure differential across the diaphragm diminishes and the diaphragm moves away from the fixed electrode (or electrodes) in the reference vacuum cavity, which reduces the measured capacitance.

CDG sensors are commonly used to measure pressure in vacuum chambers in which thin or thick films of material are deposited on a substrate. One common example of usage is to measure pressure during the deposition of materials onto the surface of silicon wafers during the fabrication of semiconductor devices. CDG sensors are quite useful in vacuum deposition processes that utilize multiple gasses because capacitance diaphragm gauges are highly accurate and are able to measure absolute pressure independent of gas composition.

CDG sensors are extremely sensitive and a number of factors can negatively impact the sensitivity and accuracy of the CDG sensor and can also result in a shift in the zero point of the CDG sensor. For example, these processes for manufacturing a semiconductor may take place in environments with elevated temperatures, which may result in significant heat transfer into or out of the CDG sensor and the associated connections, causing the temperature of the CDG sensor and its connections to fluctuate. These changes in temperature can alter the thermal resistances in the CDG sensor and its connections, altering the measured capacitance.

Techniques have been used to actively remove heat away from the electronics or to passively thermally insulate the electronics from the heated sensor; however, known techniques are limited by a maximum heat differential between the electronics and the sensor.

SUMMARY

What is needed, therefore, is an improved pressure gauge assembly that houses a CDG sensor while also preventing significant heat transfer into or out of the CDG sensor and its connections.

One aspect of the disclosed embodiments is a capacitance diaphragm gauge (CDG) assembly that includes a CDG sensor positioned within a vacuum enclosure, which is maintained at a vacuum. The CDG sensor generates sensor signals responsive to a pressure of an applied gas. The vacuum enclosure provides thermal insulation and barometric pressure isolation around the CDG sensor. The CDG sensor is maintained at a selected operating temperature using an internal heater positioned on the CDG sensor. The internal heater is responsive to external heater control signals. The temperature of the CDG sensor is monitored using an internal temperature sensor mounted on the CDG sensor. The temperature sensor generates a temperature signal. The vacuum enclosure includes an end cap that seals the vacuum enclosure. Connectors positioned through the end cap communicate the sensor signals, the heater control signals and the temperature signals through the end cap. The connectors are hermetically sealed to the end cap to maintain the vacuum within the vacuum enclosure.

Another aspect of the disclosed embodiments is thermal control system for a capacitance diaphragm gauge (CDG) sensor having at least a first sensor signal wire and having a gas inlet tube. The gas inlet tube has an outer surface. The thermal control system comprises a vacuum enclosure that includes a first end and a second end. The first end opens into a cavity in which the CDG sensor is mounted. The second end includes a through bore passing into the cavity. The outer surface of the gas inlet tube is hermetically sealed to the vacuum enclosure. An end cap is hermetically sealed to the first end of the vacuum enclosure to seal the cavity of the vacuum enclosure. A first sensor signal connector passes through a first through bore of the end cap. The first sensor signal connector is hermetically sealed to the end cap. The first sensor signal connector is electrically connected to the first sensor signal wire. An internal heater is mounted to the CDG sensor within the vacuum enclosure. The internal heater having an internal heater cable. A sensor heater connector passes through a second through bore of the end cap. The sensor heater connector is hermetically sealed to the end cap. The sensor heater connector is electrically connected to the internal heater cable. An internal temperature sensor is coupled to the CDG sensor. The internal temperature sensor has at least a first temperature sensor wire and a second temperature sensor wire. At least a first temperature sensor connector is electrically connected to the first temperature sensor wire and a second temperature sensor connector is electrically connected to the second temperature sensor wire. The first temperature sensor connector passes through a third through bore of the end cap. The second temperature sensor connector passes through a fourth through bore of the end cap. The first and second temperature sensor connectors are hermetically sealed to the end cap. An evacuation tube passes through a fifth through bore of the end cap. The evacuation tube is hermetically sealed to the end cap. The evacuation tube is configured to enable gas to be removed from the cavity of the enclosure to form a vacuum insulator around the CDG sensor within the cavity.

In certain embodiments in accordance with this aspect, an external heater is positioned on the closed second end of the vacuum enclosure proximate to the gas inlet tube. The thermal control system further includes an enclosure temperature sensor positioned on the closed second end of the vacuum enclosure proximate to the external heater.

In certain embodiments in accordance with this aspect, the internal temperature sensor is a two-wire resistance temperature detector (RTD).

In certain embodiments in accordance with this aspect, the internal temperature sensor is a four-wire resistance temperature detector (RTD).

In certain embodiments in accordance with this aspect, an ion gauge is positioned in a through bore of the end cap. The ion gauge is hermetically sealed to the end cap. The ion gauge is configured to detect the presence of gas molecules within the cavity of the vacuum enclosure.

In certain embodiments in accordance with this aspect, a getter assembly is positioned in a through bore of the end cap. The getter assembly is hermetically sealed to the end cap. The getter assembly is configured to remove contaminants from the cavity of the vacuum enclosure.

In certain embodiments in accordance with this aspect, the first sensor signal wire comprises an ultrahigh vacuum coaxial cable.

In certain embodiments in accordance with this aspect, the first sensor signal connector is hermetically sealed to the end cap by a glass seal.

In certain embodiments in accordance with this aspect, the first sensor signal connector is a coaxial connector having a central signal pin and an outer shield. The central pin of the coaxial connector is secured within the outer shield by an inner glass seal that electrically isolates the central pin from the outer shield and that provides a hermetic seal around the central pin. The outer shield of the coaxial connector is secured to the end cap by an outer glass seal that electrically isolates the outer shield from the end cap and that provides a hermetic seal around the outer shield.

In certain embodiments in accordance with this aspect, the first sensor signal connector is a coaxial connector having a central signal pin and an outer shield. The central pin of the coaxial connector is secured within the outer shield by an inner glass seal that electrically isolates the central pin from the outer shield and that provides a hermetic seal around the central pin. The outer shield of the coaxial connector is secured to a weldable cylindrical structure by an outer glass seal that electrically isolates the outer shield from weldable cylindrical structure and that provides a hermetic seal around the outer shield. The weldable cylindrical structure is welded to the end cap to form a hermetic seal between the end cap and the weldable cylindrical structure.

In certain embodiments in accordance with this aspect, the CDG sensor has a second sensor wire. The thermal control system further includes a second sensor signal connector passing through a sixth through bore of the end cap. The second sensor signal connector is hermetically sealed to the end cap. The second sensor signal connector is electrically connected to the second sensor signal wire.

Another aspect of the disclosed embodiments is method of maintaining a capacitance diaphragm gauge (CDG) sensor at an elevated operating temperature. The method comprises positioning the CDG sensor having at least a first CDG sensor wire within a vacuum enclosure having a first end and a second end. The method extends a gas inlet tube of the CDG sensor through the first end of the vacuum enclosure and hermetically seals an outer surface of the gas inlet tube to the first end of the vacuum enclosure. The method positions an internal heater on at least one surface of the CDG sensor. The internal heater is coupled to at least first and second current supply wires. The method positions a temperature sensor on the CDG sensor. The temperature sensor has a plurality of temperature sensor wires. The method connects the CDG sensor wire, the current supply wires and the temperature sensor wires to respective feedthrough connectors. The method inserts the feedthrough connectors through an end cap and hermetically seals the feedthrough connectors to the end cap. The method hermetically seals the end cap to the second end of the vacuum enclosure to form a gas-tight cavity within the vacuum enclosure. The method evacuates the vacuum enclosure to reduce the pressure within the vacuum enclosure such that the reduced pressure within the vacuum enclosure form a thermally insulating barrier around the CDG sensor while also providing a reference cavity at ultralow pressure levels (ultrahigh vacuum levels) for configuring the CDG sensor to read absolute pressure.

In certain embodiments in accordance with this aspect, the temperature sensor is a resistance temperature detector (RTD) having at least two wires.

In certain embodiments in accordance with this aspect, the RTD has four wires comprising two current carrying wires and two voltage measuring wires.

In certain embodiments in accordance with this aspect, the feedthrough connectors are hermetically sealed to the end cap using glass seals.

In certain embodiments in accordance with this aspect, the CDG sensor wire comprises an ultrahigh vacuum coaxial cable.

In certain embodiments in accordance with this aspect, each of the heater current supply wires and each of the temperature sensor wires comprise an ultrahigh vacuum wire.

In certain embodiments in accordance with this aspect, the feedthrough connector connected to the CDG sensor wire is a coaxial connector having a central signal pin and an outer shield. The central pin of the coaxial connector is secured within the outer shield by an inner glass seal that electrically isolates the central pin from the outer shield and that provides a hermetic seal around the central pin. The outer shield of the coaxial connector is secured to the end cap by an outer glass seal that electrically isolated the outer shield from the end cap and that provides a hermetic seal around the outer shield.

In certain embodiments in accordance with this aspect, the feedthrough connector connected to the CDG sensor wire is a coaxial connector having a central signal pin and an outer shield. The central pin of the coaxial connector is secured within the outer shield by an inner glass seal that electrically isolates the central pin from the outer shield and that provides a hermetic seal around the central pin. The outer shield of the coaxial connector is secured to a weldable cylindrical structure by an outer glass seal that electrically isolates the outer shield from weldable cylindrical structure and that provides a hermetic seal around the outer shield. The weldable cylindrical structure is welded to the end cap to form a hermetic seal between the end cap and the weldable cylindrical structure.

BRIEF DESCRIPTIONS OF THE DRAWINGS

The foregoing aspects and other aspects of the disclosure are described in detail below in connection with the accompanying drawings in which.

DESCRIPTION OF ILLUSTRATED EMBODIMENTS

Figure 1:
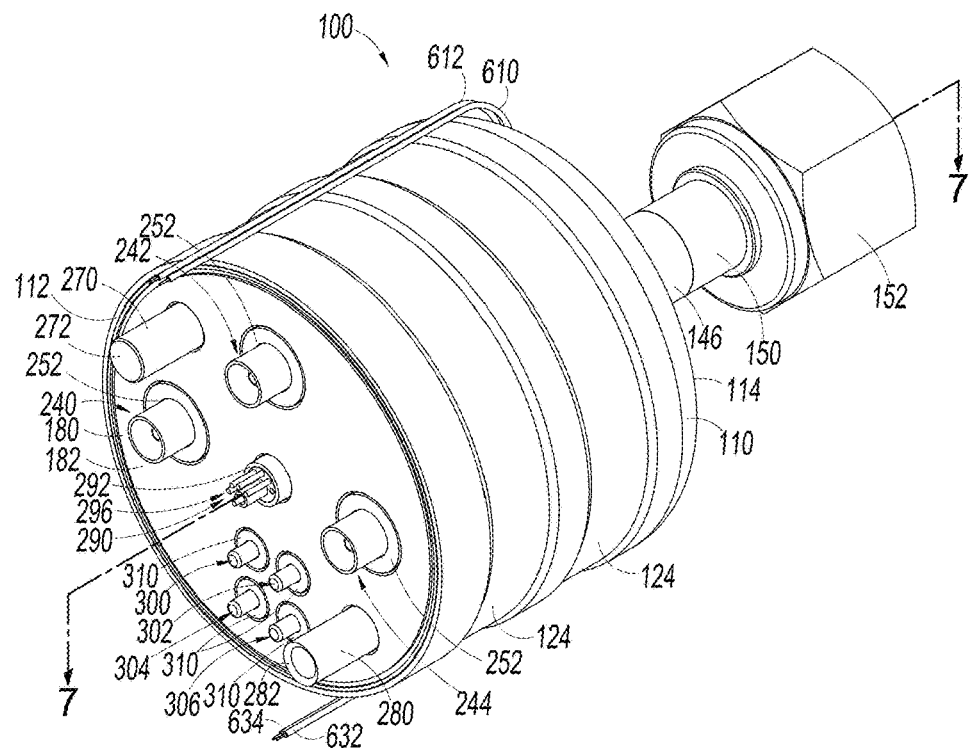
FIG. 1 illustrates a proximal perspective view of the CDG assembly showing connectors to couple the CDG assembly to a control and monitoring system (not shown)
Figure 2:
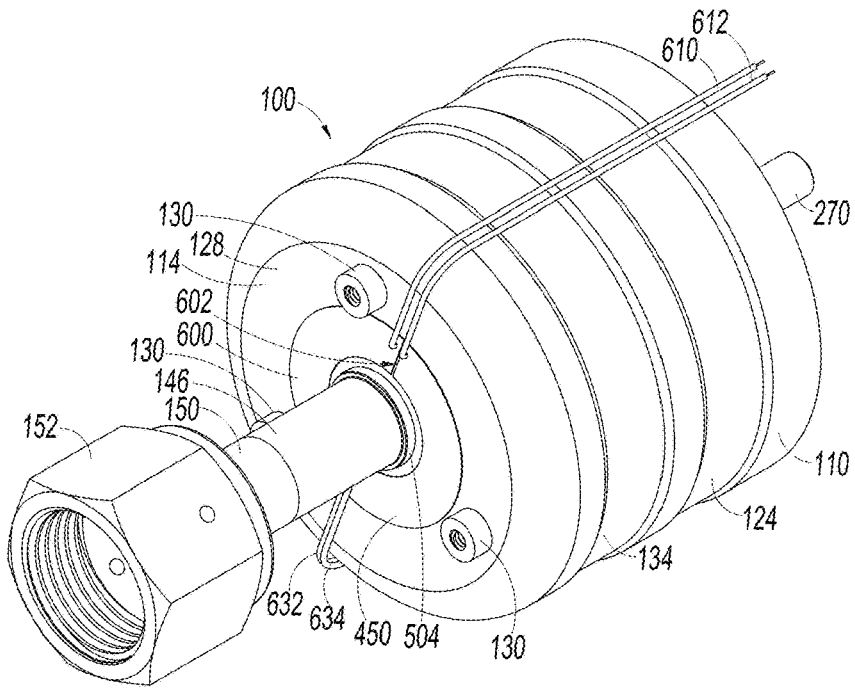
FIG. 2 illustrates a distal perspective view of the CDG assembly of FIG. 1.

As used throughout this specification, the words "upper," "lower," "longitudinal," "upward," "downward," "proximal," "distal," and other similar directional words are used with respect to the views being described.

FIGS. 1-15 illustrate an embodiment of a capacitance diaphragm (CDG) assembly 100 that operates in a high temperature environment. The CDG assembly connects to one or more electronics systems (not shown). The electronics systems are configured to control or receive outputs from the components contained within the CDG assembly.

The CDG assembly 100 includes a cylindrical vacuum enclosure 110. The vacuum enclosure has a first end 112 and a second end 114. The first end is open and the second end is closed. A cavity 116 is formed within the vacuum enclosure between the first end and the second end. The second end of the vacuum enclosure includes a central through bore 118 (see FIG. 4) that provides access to the cavity through the second end.

The cavity 116 of the vacuum enclosure 110 has a cylindrical inner surface 120 between the first end 112 and the second end 114. The vacuum enclosure has a generally cylindrical outer surface 122, which has reduced diameter portions 124, which assist in controlling heat conduction as described below. The second end of the vacuum enclosure has an inner surface 126 (see FIG. 7) and an outer surface 128. Central portions of the inner and outer surfaces of the second end are substantially flat. The vacuum enclosure is curved between the second end and the cylindrical outer surface.

The vacuum enclosure 110 further includes a plurality of mounting standoffs 130 (e.g., three standoffs in the illustrated embodiment). The standoffs include internal threads that enable the standoffs to receive mounting screws (not shown) that can be used to secure the vacuum enclosure to a support structure (not shown). The standoffs are secured to the outer surface 128 of the second end 114 of the vacuum enclosure by spot welding or another suitable technique.

The CDG assembly 100 includes a CDG sensor 140, which is positioned within the cavity 116 of the vacuum enclosure 110. The internal structure of an exemplary CDG sensor is described below. The CDG sensor includes a first end 142 and a second end 144. An inlet tube 146 is secured to the second end of the CDG sensor to provide a conduit for a gas that has a pressure to be measured by the CDG sensor. The CDG sensor is inserted into the cavity of the vacuum enclosure with the inlet tube extending through the through bore 118 of the second end 114 of the vacuum enclosure. A portion of the outer circumference of the inlet tube is secured (e.g., by hermetic welding or another suitable technique) to the second end of the vacuum enclosure to fixedly position the CDG sensor within the cavity and to provide a gas-tight seal between the second end of the vacuum enclosure and the outer circumference of the inlet tube.

After inserting the CDG sensor 140 into the cavity 116 and securing the inlet tube 146 to the second end 114 of the vacuum enclosure 110, a tubular gland 150 is secured to the end of the inlet tube (e.g., by hermetic welding or other suitable technique). The tubular gland is rotatably coupled to a conventional female stainless-steel coupling nut (e.g., a VCR 8 nut) 152, which allows the CDG sensor to be hermetically coupled to a system (not shown) having a gas to be measured.

The cavity 116 of the vacuum enclosure 110 defines the cylindrical inner surface 120 that extends from the second end 114 to the first end 112 of the vacuum enclosure. The inner surface has a substantially constant diameter from the second end to a ledge location 160, which is displaced from the first end. The diameter of the inner surface increases at the ledge location so that the diameter is larger from the ledge location to the first end. For example, the increase in diameter is approximately 0.08 inch in the illustrated embodiment. The increase in diameter at the ledge location forms a ledge 162, which is positioned approximately 0.25 inch from the first end of the vacuum enclosure. A portion of the vacuum enclosure from the ledge to the first end of the vacuum enclosure is referred to below as an end cap receiving portion 164.

The CDG assembly 100 further includes an end cap 180, which is disk shaped in the illustrated embodiment. The end cap has an outer diameter that is selected to fit snugly within the end cap receiving portion 164 of the vacuum enclosure 110. The end cap has a thickness between an outer surface 182 and an inner surface 184. The thickness is selected to be approximately the same as the cylindrical length of the end cap receiving portion (e.g., approximately 0.25 inch). When the end cap is positioned in the vacuum enclosure 110, the inner surface of the end cap rests on the ledge 162 and the outer surface of the end cap is substantially flush with the first surface 112 of the vacuum enclosure. The snug fit of the end cap with the vacuum enclosure allows the end cap to be sealed to the vacuum enclosure using hermetic welding or another suitable technique. As further described below, the end cap hermetically seals the vacuum enclosure so that any potential gas contaminants can be removed from the cavity 116 and a low pressure (e.g., less than approximately $10^{-9}$ torr) can be maintained within the cavity. The low pressure (ultrahigh vacuum) provides a thermal barrier between the CDG sensor 140 and the inner walls of the vacuum enclosure.

The cylindrical inner surface 120 and the generally cylindrical outer surface 122 of the vacuum enclosure, the inner surface 126 and the outer surface 128 of the second end 112 of the vacuum enclosure and the inner surface 184 of the end cap 180 are highly reflective to reflect heat generated within the cavity back into the cavity. For example, in the illustrated embodiment, the emissivity of the surfaces is less than or equal to approximately 0.1 (e.g., $\varepsilon \leq 0.1$). The highly reflective surfaces may be formed by electropolishing, metallization of a ceramic or a combination of both techniques.

Figure 5:
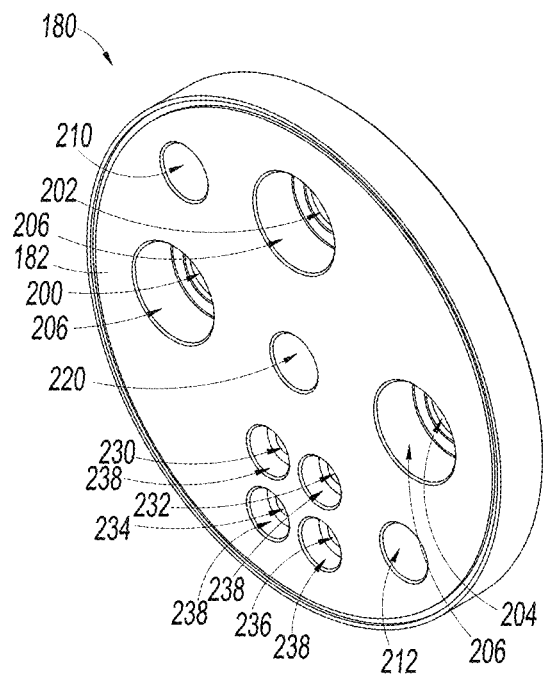
FIG. 5 illustrates a proximal perspective view of the outer surface of the end cap of the CDG assembly of FIG. 1 prior to insertion of the connectors and other components into the end cap.
Figure 6:
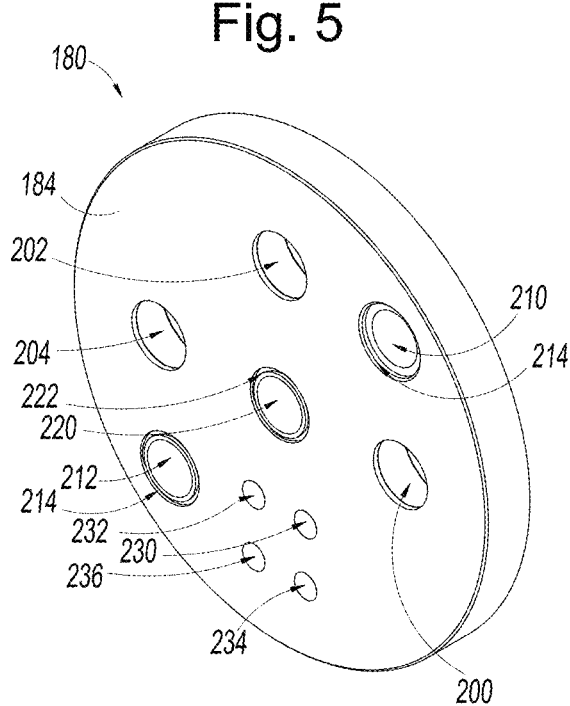
FIG. 6 illustrates a distal perspective view of the inner surface of the feedthrough cap of FIG. 5.

The end cap 180 prior to installation of connectors and other components is illustrated in FIGS. 5 and 6. As illustrated the end cap includes a first through bore 200, a second through bore 202 and a third through bore 204, which extend through the end cap from the outer surface 182 to the inner surface 184. The first, second and third through bores have a first diameter. Each of the first, second and third through bores are surrounded by a respective counterbore portion 206. Each counterbore portion extends from the outer surface for a selected depth less than the thickness of the end cap. The purposes of the counterbore portions are described below.

The end cap 180 has a fourth through bore 210 and a fifth through bore 212, which extend from the outer surface 182 to the inner surface 184. In the illustrated embodiment, the fourth and fifth through bores have smaller diameter than the first, second and third through bores 200, 202, 204, and are not surrounded on the outer surface by counterbore portions. In the illustrated embodiment, each of the fourth though bore and the fifth through bore is surrounded by a respective shallow counterbore 214 at the inner surface.

The end cap 180 has a sixth through bore 220, which is positioned approximately in the center of the end cap in the illustrated embodiment. The sixth through bore has a diameter approximately the same as the diameters of the fourth and fifth through bores 210, 212. The sixth through bore is not surrounded by a counterbore portion at the outer surface 182 of the end cap. The sixth through bore is surrounded by a shallow counterbore portion 222 at the inner surface 184 of the end cap.

The end cap 180 has a seventh through bore 230, an eighth through bore 232, a ninth through bore 234 and a tenth through bore 236. In the illustrated embodiment, the seventh, eighth, ninth, and tenth through bores are positioned in a generally rectangular pattern and have the same diameters, which are smaller than the diameters of the previously described through bores. Each of the seventh, eighth, ninth, and tenth through bores is surrounded by a respective counterbore portion 238. Each counterbore portion extends from the outer surface for a selected depth less than the thickness of the end cap. The purposes of the counterbore portions are described below.

Figure 3:
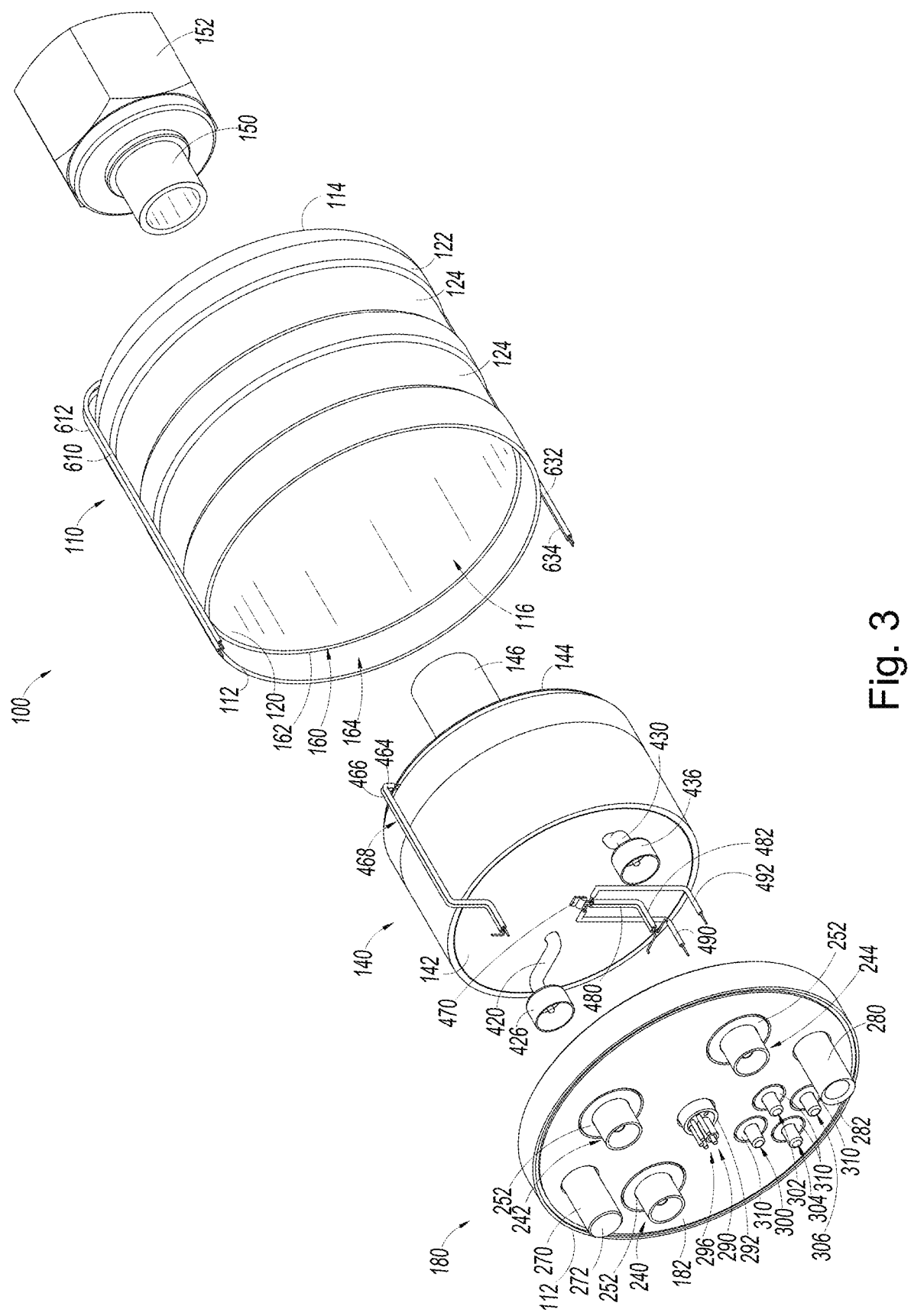
FIG. 3 illustrates an exploded proximal perspective view of the CDG assembly of FIG. 1.
Figure 4:
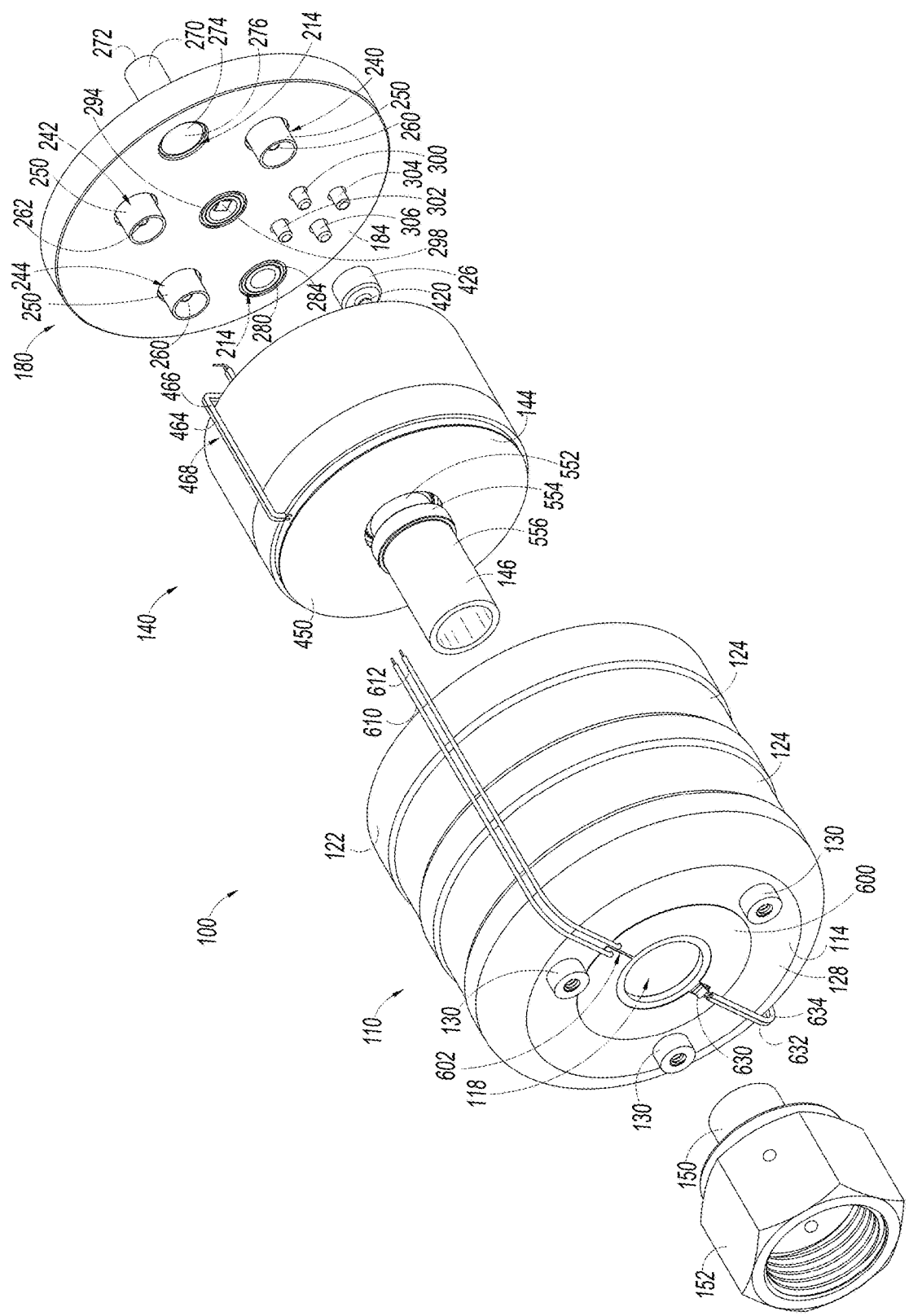
FIG. 4 illustrates an exploded distal perspective view of the CDG assembly of FIG. 1.
Figure 7:
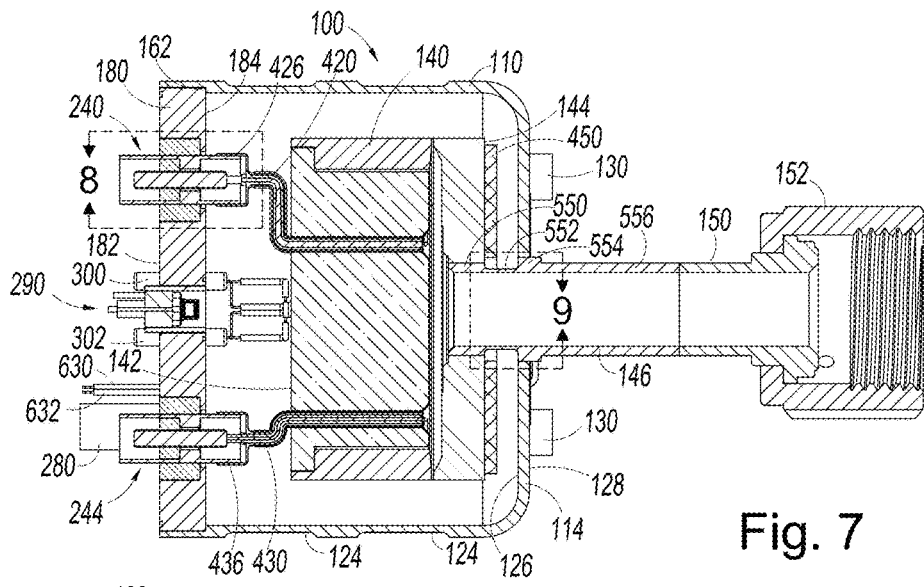
FIG. 7 illustrates a cross-sectional view of the CDG assembly of FIG. 1 taken along the line 7-7 in FIG. 1.

As shown in FIGS. 1, 3, and 7, each of the first through bore 200, the second through bore 202, and the third through bore 204 of the end cap 180 receives a respective coaxial connector assembly. The first through bore receives a first coaxial connector assembly 240. The second through bore receives a second coaxial connector assembly 242. The third through bore receives a third coaxial connector assembly 244. As described herein, the three coaxial connectors and other connectors described below are feedthrough connectors that extend through the end cap and feed signals, currents, or voltages through the end cap.

Figure 8:
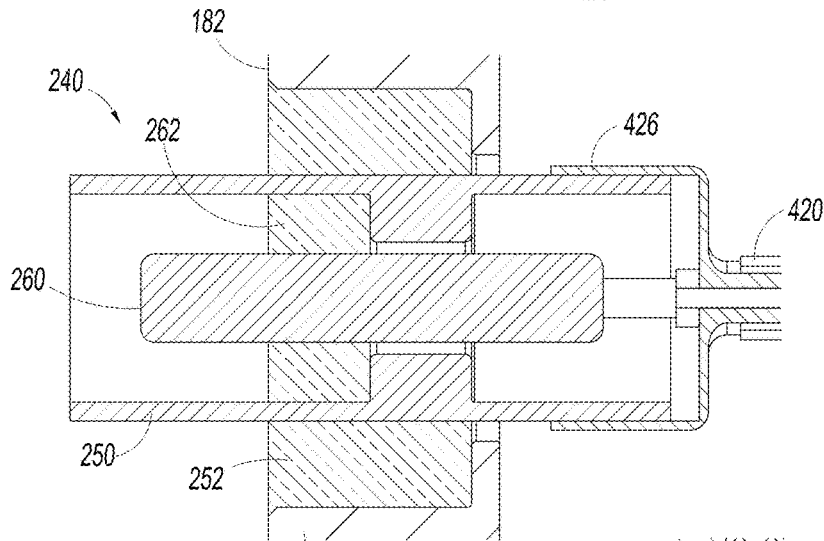
FIG. 8 illustrates an enlarged cross-sectional view of the first connector assembly of the CDG assembly taken within the area -8- in FIG. 7.

As shown in more detail in the enlarged cross-sectional view of FIG. 8 for the first coaxial connector assembly 240, each coaxial connector assembly includes an outer shield 250, which extends outward from the outer surface 182 of the end cap 180 by a selected first distance, extends through the respective through bore (e.g., the first through bore 200 in FIG. 5), and extends inward from the inner surface 184 of the end cap by a selected second distance. As further illustrated in FIG. 8, the outer shield has an outer diameter smaller than the inner diameter of the through bore such that the outer shield does not contact the inner surface of the through bore. The outer shield is centered within the through bore and is maintained in a fixed position by depositing viscous glass around the outer shield. The viscous glass fills the counterbore portion 206 to form a first glass retaining ring around the outer shield such that the outer shield cannot move from the centered position after the glass sets (hardens). The first glass retaining ring also forms a hermetic seal around the outer shield.

As further shown in FIG. 8, each coaxial connector assembly (e.g., the illustrated first coaxial connector assembly 240) includes a central pin 260, which is positioned along a cylindrical axis (not shown) of the outer shield 250. The central pin has a length selected to be less than the length of the outer shield and is positioned such that the central pin does not extend to or beyond either end of the outer shield. The central pin is centered within the outer shield so that the central pin is electrically isolated from the outer shield. The central pin is maintained in a fixed position by depositing viscous glass around the central pin. The viscous glass fills a portion of the volume between the inner surface of the outer shield and the central pin to form a second glass retaining ring 262 around the central pin such that the central pin cannot move from the centered position after the glass sets (hardens). The second glass retaining ring also forms a hermetic seal around the central pin. One skilled in the art will appreciate that the central pin may be fixed within the outer shield by a connector manufacturer such that the central pin and the outer shield form the connector assembly 250, which is then installed in the end cap 180 in one operation.

As discussed above, each of the second connector assembly 242 and the third connector assembly 244 is constructed in a similar manner to the second connector assembly.

The fourth through bore 210 receives and retains a cylindrical getter assembly 270. The getter assembly has a first end 272, which extends outward from the outer surface 182 of the end cap 180. The getter assembly has second end 274, which is positioned within the counterbore 214 and is thereby recessed a small distance from the inner surface 184 of the end cap. The second end includes a screen 276. The second end and the screen of the getter assembly are hermetically sealed to the counterbore by hermetic welding or another suitable technique. The getter assembly houses a getter material (not shown) such as a sintered zirconia getter. The getter assembly operates in a conventional manner to remove small amounts of gas that may be present within the cavity 116 of the vacuum enclosure 110.

The fifth through bore 212 of the end cap 180 receives a cylindrical evacuation tube 280. The evacuation tube has a first end 282 and a second end 284. The second end of the evacuation tube is positioned within the counterbore 214 on the inner surface 184 of the end cap and is hermetically secured to the counterbore by cold welding or another suitable technique for producing a hermetic seal. The evacuation tube may be made of copper or any other appropriate material. In the figures, the first end of the evacuation tube is illustrated as initially open to allow gas to be removed from the cavity 116. After the gas is removed, the evacuation tube can be cold-welded and sealed in a conventional manner to prevent gas from entering the cavity. In other embodiments, the evacuation tube may be used to re-evacuate the cavity if the initial pressure is not maintained. For example, in the illustrated embodiment, the pressure within the vacuum enclosure is maintained at approximately $10^{-8}$ Torr.

The sixth through bore 220 of the end cap 180 receives a cylindrical ion gauge assembly 290. The ion gauge assembly include an outer portion 292 and an inner portion 294. In the illustrated embodiment, the outer portion includes a plurality of connectors 296. The inner portion is recessed a short distance from the inner surface 184 of the end cap. The ion gauge assembly can be connected to the feedthrough cap through welding or another suitable technique to provide an airtight (hermetic) seal. The ion gauge assembly includes a miniature pressure transducer 298 positioned near the inner surface of the end cap. In the illustrated embodiment, the ion gauge is an ionization (cold cathode) pressure gauge that is controlled by a control unit (not shown) connected to the ion gauge assembly by the plurality of connectors. The ion gauge assembly generates an output signal that represents the pressure within the cavity 116 of the vacuum enclosure 110. The output signal is monitored and compared to an acceptable maximum pressure. The evacuation tube can be used to remove gas if the pressure within the cavity exceeds the acceptable maximum pressure. In the illustrated embodiment, the ion gauge assembly corresponds to the ion gauge disclosed in U.S. Pat. No. 9,683,908, which is incorporated herein by reference.

The seventh through bore 230 of the end cap 180 receives a first sensor pin 300. The eighth through bore 232 of the end cap receives a second sensor pin 302. The ninth through bore 234 of the end cap receives a third sensor pin 304. The tenth through bore 236 of the end cap a fourth sensor pin 306. Each sensor pin is centered within the respective through bore. Each sensor pin has a first end that extends a first selected distance from the outer surface 182 of the end cap. Each sensor pin has a second end that extends a second selected distance from the inner surface 184 of the end cap. In the illustrated embodiment, the second selected distance is less than the first selected distance. Each sensor pin is retained within the respective through bore by a respective glass ring 310 formed as described above. Each glass ring provides a hermetic seal round the respective sensor pin and also provides electrical isolation from the end cap 180. As described below, the four sensor pins are connected to an internal temperature sensor.

Figure 16:
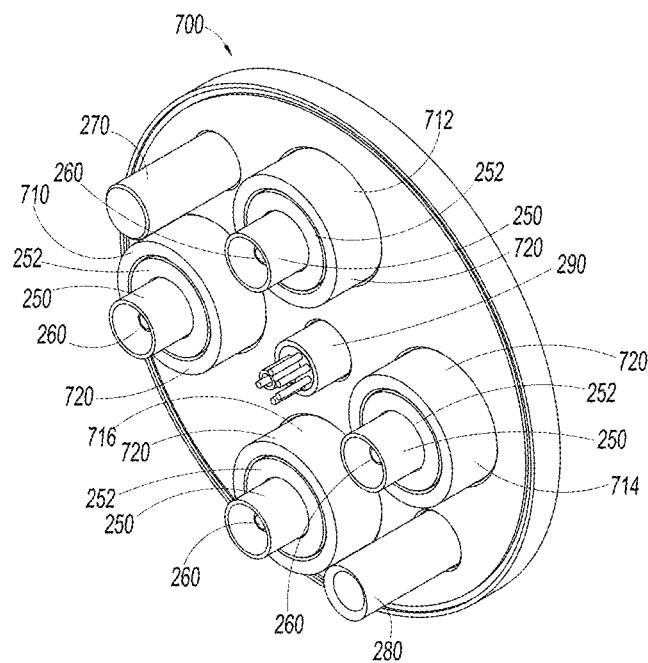
FIG. 16 illustrates a proximal perspective end view of an alternative embodiment of an end cap in which the feedthrough connectors are welded to the end cap to hermetically seal the connectors.

In an alternative embodiment described below with respect to FIG. 16, the glass ring surrounding the coaxial connectors can be eliminated by directly welding the outer shields of the coaxial connectors to the end cap.

Figure 10:
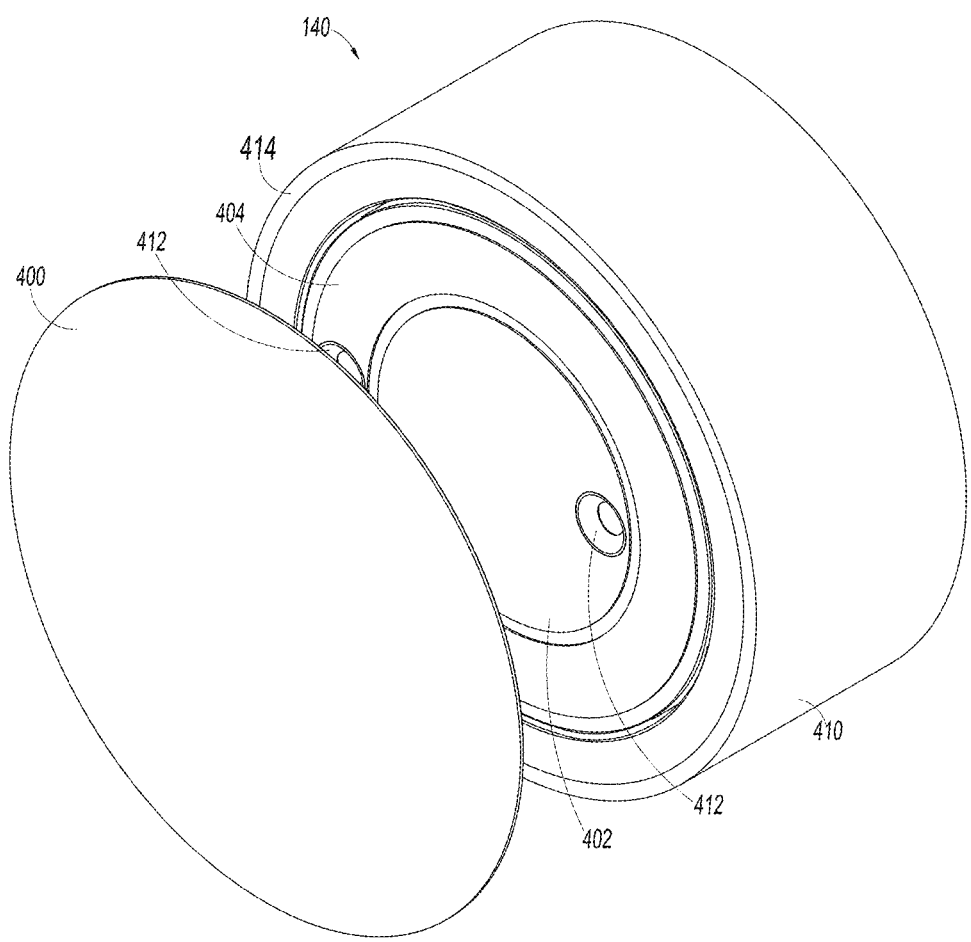
FIG. 10 illustrates an exploded view of a portion of the CDG sensor of FIGS. 3, 4, and 7 showing the electrode support structure, the fixed electrodes, and the diaphragm, the diaphragm shown spaced apart from the fixed electrodes prior to securing the diaphragm to the electrode support structure.

As illustrated in FIG. 10, the CDG sensor 140 includes a diaphragm 400, a first fixed electrode 402 and a second fixed electrode 404. The first electrode is a central circular (disk-shaped) electrode. The second electrode is an annular electrode that surrounds the first electrode and is spaced apart from the first electrode. The two electrodes are mounted on a support structure 410 such as alumina. Each electrode has a respective contact location 412. The diaphragm is illustrated spaced apart from the two electrodes in FIG. 10. When the CDG sensor is manufactured, the diaphragm is mounted to a circumferential ring 414 around the support structure to position the diaphragm a small distance away from the two electrodes to form a cavity (not shown) between the diaphragm and the electrodes.

In the illustrated embodiment, the cavity (not shown) within the sensor 140 is evacuated to a known absolute pressure, and the evacuated cavity is sealed permanently. The CDG sensor may include a sensor getter assembly (not shown) that extends into the evacuated cavity. The sensor getter assembly, if included, operates in a convention manner to remove contaminants from the evacuated cavity, which could affect the pressure within the evacuated cavity. In alternative embodiments, a conduit may be provided to connect the sensor cavity to the cavity 116 of the vacuum enclosure 110. In such a configuration, the sensor cavity is evacuated when the cavity of the vacuum enclosure is evacuated, and the pressure of the sensor cavity is maintained at the same ultralow pressure as the pressure of the cavity of the vacuum enclosure. In such an embodiment, the sensor may include a separate getter (not shown) for the sensor cavity. Alternatively, the previously described getter assembly 270 of the vacuum enclosure may operate to remove contaminants from the sensor cavity as well as the cavity of the vacuum enclosure.

Various configurations of CDG sensors may be used in combination with the embodiments disclosed herein. For example, the first fixed electrode 402 and the second fixed electrode 404 may be replaced with a single fixed electrode (not shown), which is positioned as shown for the first fixed electrode.

A gas having a pressure to be measured is applied against the diaphragm 400 via the inlet tube 146 (FIGS. 1-5). The diaphragm is grounded or maintained at another fixed reference voltage. A respective signal is applied to each of the first fixed electrode 402 and the second fixed electrode 404. Increasing the pressure against the outer surface of the diaphragm moves the inner surface of the diaphragm closer to the fixed electrodes 402, 404 and increases the capacitance between the diaphragm and each of the two fixed electrodes. Decreasing the pressure against the outer surface of the diaphragm allows the diaphragm to move farther from the fixed electrodes and decreases the capacitances. Changes in the capacitances cause variations in a respective measured signal for each fixed electrode; and the signal variations are evaluated to determine the pressure.

Figure 11:
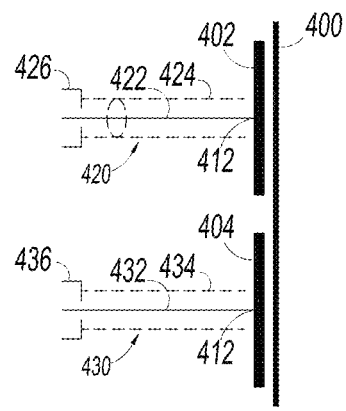
FIG. 11 illustrates a simplified circuit diagram of the diaphragm, the fixed electrodes, and the coaxial cables connected to the fixed electrodes.

As illustrated schematically in FIG. 11 for the illustrated embodiment, the contact location 412 of the first fixed electrode 402 of the CDG sensor 140 is connected to the inner conductor 422 of a first coaxial cable 420. The first coaxial cable has an outer shield 424. The first coaxial cable has a coaxial connector 426, which is coupled to the first coaxial connector assembly 250 to thereby connect the central pin 260 of the first coaxial connector assembly to the first fixed electrode. The contact location 412 of the second fixed electrode 404 of the CDG sensor is connected to the inner conductor 432 of a second coaxial cable 430. The second coaxial cable has an outer shield 434. The second coaxial cable has a coaxial connector 436, which is coupled to the third coaxial connector assembly 254 to thereby connect the central pin 260 of the third coaxial connector assembly to the second fixed electrode. The outer shields of the coaxial cables are connected to signal ground when the respective coaxial cable assemblies are connected to an external control system (not shown). In the illustrated embodiment, the outer shields of the coaxial cables are not connected within the CDG sensor (e.g., the outer shields float within the CDG sensor). In other embodiments, the outer shields can be connected to a metalized portion of the alumina body of the sensor to provide another shielding option. The two cables and the connectors are also shown in FIGS. 3 and 5. In the illustrated embodiment, the first and second coaxial cables are ultrahigh vacuum (UHV) rated coaxial cables as discussed below. The conductors of the coaxial cables can be connected to the central pins and the outer shields of the coaxial connector assemblies by spot welding. The conductors can also be connected to the connector assemblies by using connectors or springs.

As discussed above, CDG sensors are sensitive to temperature changes. Since a CDG sensor can operate in a system where the temperature of the gas being measured may fluctuate, the operating temperature of the CDG sensor can also change. Accordingly, a need exists for a system and method for maintaining a substantially constant operating temperature for the CDG sensor.

The illustrated CDG sensor 140 includes features that enable the operating temperature of the CDG sensor to be controlled even if the temperature of the gas being measured fluctuates. The CDG sensor includes a sensor heater 450, which is mounted on the second end 144 of the CDG sensor proximate to the inlet tube 146. In the illustrated embodiment, the sensor heater is thick-film ceramic heater having an annular configuration. The sensor heater can be mechanically attached to the second end of the CDG sensor using screws. Alternatively, the sensor heater can be bonded to the second end of the CDG sensor using an ultrahigh vacuum (UHV) rated adhesive.

The annular configuration of the sensor heater 450 has an inner diameter that forms an opening that surrounds the inlet tube 146. The annular configuration has an outer diameter that is slightly smaller than an outer diameter of the second end of the CDG sensor 140. Respective first ends of a first sensor heater wire 464 and a second sensor heater wire 466 are connected to the sensor heater, wherein the first sensor heater wire and the second sensor heater wire form a sensor heater cable 468. A second end of the first sensor heater wire is connected to the central pin 260 of the second coaxial connector assembly 242. A second end of the second sensor heater wire is connected to the outer shield 250 of the second coaxial connector assembly. The coaxial connector assembly provides a connection to a controlled power source (not shown) that provides an electrical current to the sensor heater. When the electrical current is applied, the sensor heater is activated and provides heat to the CDG sensor. The heat provided by the sensor heater permeates the CDG sensor and causes the overall temperature of the CDG sensor to increase. The exposed surface of the sensor heater is highly reflective (e.g., an emissivity of 0.1 or less) such that the heat generated by the sensor heater is directed into the CDG sensor.

Figure 12:
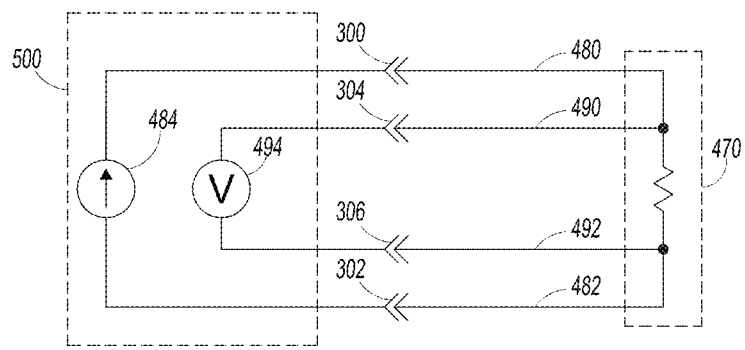
FIG. 12 illustrates a simplified circuit diagram of the four-wire resistance temperature detector (RTD) on the surface of the CDG sensor and the connections to the current source and the voltage measurement system.

The temperature of the CDG sensor 140 is monitored by a temperature sensor 470, which is secured (e.g., bonded) to the first surface 142 of the CDG sensor. In the illustrated embodiment, the temperature sensor is a resistance temperature detector (RTD). The RTD can be a two-wire RTD, which passes a small current through the resistance of the RTD and measures the voltage developed across the RTD. The same two wires are used to apply the current and to measure the voltage. In the illustrated embodiment, the RTD is a four-wire RTD, which is illustrated schematically in FIG. 12. The four-wire RTD includes a first sensor wire 480 and a second sensor wire 482, which apply the current to the resistance of the RTD. As shown in FIG. 12, the first sensor wire is connected to the first sensor pin 300, and the second sensor wire is connected to the second sensor pin 302. A current from a constant current source 484 (shown schematically in FIG. 12) is applied to one of the first and second sensor pins and returns on the other of the first and second sensor pins. In a two-wire RTD system (not shown), the two wires that supply the current and that communicate the measured voltage may be coupled to a single coaxial connector assembly (not shown) similar to the second coaxial connector assembly 242.

A voltage develops across the RTD 470 that is proportional to the resistance of the RTD. The resistance increases with increases in temperature. Thus, the voltage may be used to determine the temperature of the first surface of the RTD. The voltage across the RTD is communicated to the third sensor pin 304 and the fourth sensor pin 306 by a third sensor wire 490 and a fourth sensor wire 492. The third and fourth sensor pins are connected to a voltage measuring system 494 (shown schematically in FIG. 12). The voltage measuring system has a high impedance input such that substantially no current flows through the third and fourth sensor wires. Accordingly, the measured voltage is not affected by any resistance changes in the third and fourth sensor wires that can be caused by changes in the temperature.

Figure 13:
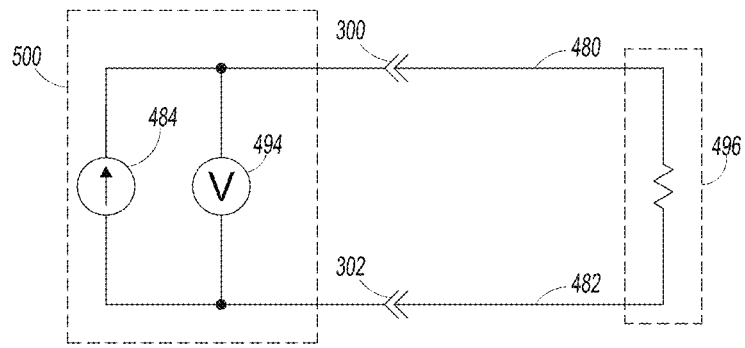
FIG. 13 illustrates a simplified circuit diagram of a two-wire RTD for measuring the temperature of the CDG.
Figure 14:
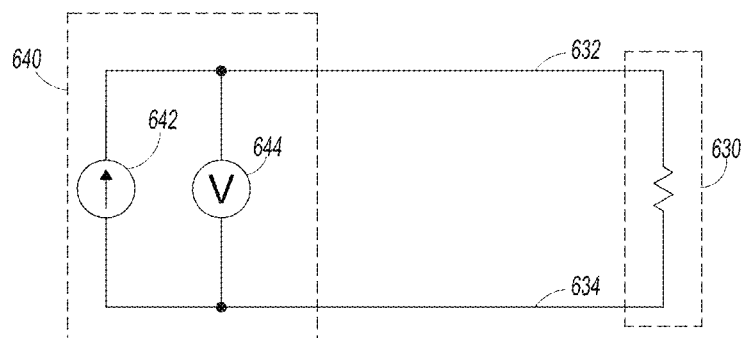
FIG. 14 illustrates a simplified circuit diagram of a two-wire RTD for measuring the external temperature of the vacuum enclosure.
Figure 15:
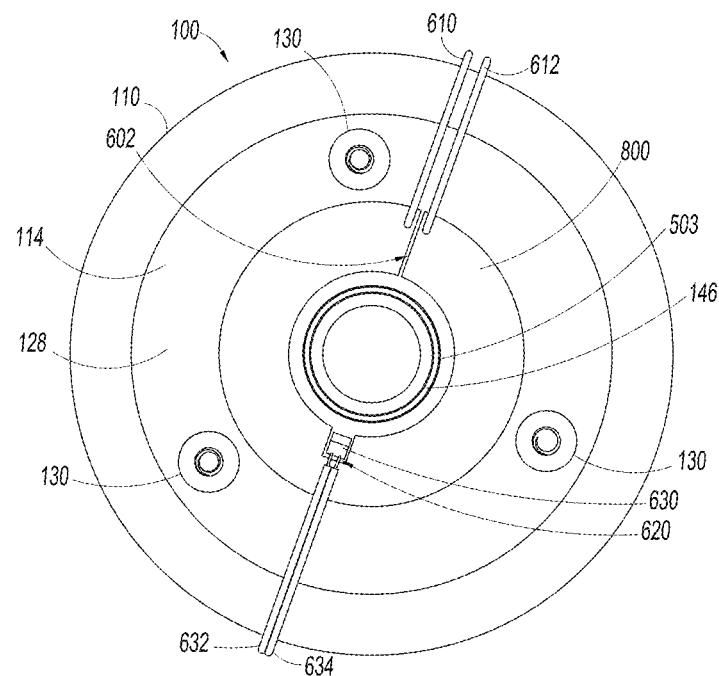
FIG. 15 illustrates a distal end view of the vacuum enclosure of FIGS. 1-4 with the gland and coupling nut removed to show the connections to the external heater and the external temperature sensor.

If a two-wire RTD 496 is used as illustrated schematically in FIG. 13, the first sensor wire 480 and the second sensor wire 482 carry the current and also measure the voltage. The first sensor pin 300 and the second sensor pin 302 can be used as described above. Alternatively, the two sensor wires may be connected to a fourth coaxial connector assembly (not shown) in a manner similar to the connection of the first sensor heater wire 464 and the second sensor heater wire 466 to the second coaxial connector assembly 242 as described above.

As further shown schematically in FIG. 12, the constant current source 484 and the voltage measuring system 494 are part of a sensor temperature controller 500. The sensor temperature controller is located outside the vacuum enclosure 110 and is not affected by the temperature within the vacuum enclosure. The sensor temperature controller determines a measured temperature on the first surface 142 of the CDG sensor 140 from the voltage measured by the voltage measuring system. The measured temperature may be determined from a look-up table or from a calculation. The internal temperature controller compares the measured temperature to a desired temperature and increases or decreases the heater power to achieve the desired temperature.

As discussed above, inner and outer surfaces of the vacuum enclosure 110 and the inner surface 184 of the end cap 180 are highly reflective surfaces with emissivities of 0.1 or less. This causes a substantial portion of the heat generated by the sensor heater 450 to remain within the cavity 116 of the vacuum enclosure by minimizing heat transfer via thermal radiation. However, the inlet tube 146 provides another thermal conduction path, which can contribute to heat loss from the CDG sensor 140. In particular, the inlet tube is coupled to the coupling nut 152 via the tubular gland 150. The coupling nut is thermally connected to an overall system (not shown) that can be operating at a lower temperature than the desired operating temperature of the CDG sensor. Thus, heat will flow from the CDG sensor to the coupling nut and thereby to the overall system. The CDG assembly 100 includes two features that assist in reducing the heat flow from the CDG sensor to the coupling nut and thus to the overall system.

Figure 9:
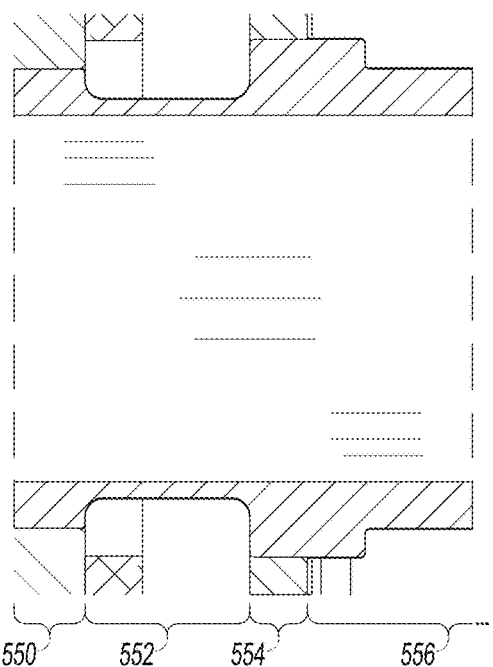
FIG. 9 illustrates an enlarged cross-sectional view of the portions of the inlet tube of the CDG assembly taken within the area -9- in FIG. 7.

As shown in the enlarged cross-sectional view in FIG. 9, the inlet tube 146 includes a first section 550, a second section 552, a third section 554, and a fourth section 556. The first, second, third and fourth sections have a substantially constant inner diameter. In the illustrated embodiment, the inner diameter is approximately 0.4 inch. The first section of the inlet tube is secured to the CDG sensor 140 and extends to the second end 144 of the CDG sensor. The second section of the inlet tube extends from the second end of the CDG sensor to the inner surface 126 of the second end 114 of the vacuum enclosure 110. The third section of the inlet tube extends from the inner surface of the second end of the enclosure and through the central through bore 118 of the second end of the vacuum enclosure. Approximately half of the third section of the inlet tube is within the central through bore, and approximately half of the third section extends beyond the outer surface 128 of the second end of the vacuum enclosure. The fourth section of the inlet tube extends from the third section of the inlet tube and is secured to the tubular gland 150.

Although the inner diameter of the inlet tube 146 is substantially constant, the outer diameter of the inlet tube varies in each section of the inlet tube to cause each section to have a selected wall thickness. In the illustrated embodiment, the first section 550 and the fourth section 556 have outer diameters of approximately 0.5 inch, which results in a wall thickness of approximately 0.05 inch.

In the illustrated embodiment, the third section 556 of the inlet tube 146 has an enlarged outer diameter of approximately 0.28125 inch, which results in a wall thickness of approximately 0.08125 inch. The diameter of the central through bore 118 of the second end 114 of the vacuum enclosure 110 is selected to have a diameter slightly greater than the outer diameter of the third section of the inlet tube so that the third section of the inlet tube fits within the central through bore with a very tight tolerance. For example, the diameter of the central through bore is approximately 0.2813 in the illustrated embodiment. The portion of the third section of the inlet tube extending beyond the outer surface 128 of the second end of the vacuum enclosure is secured to the outer surface of the second end of the vacuum enclosure by hermetic welding or another suitable technique to provide a gas-tight seal between the inlet tube.

In the illustrated embodiment, the second section 552 of the inlet tube 146 has an outer diameter of approximately 0.217 inch, which results in a wall thickness of approximately 0.017 inch. The second section has a length of approximately 0.1782 inch, which is less than half of the 0.05-inch wall thickness of the first section 550 of the inlet tube. The reduced wall thickness substantially reduces the heat flow from the CDG sensor 140 to the third section 554 and the fourth section 556 of the inlet tube, and thereby reduces the heat flow to the coupling nut 152 and other components (not shown) that are operating a lower temperature than the CDG sensor.

The CDG assembly 100 includes a further feature to maintain the temperature of the CDG sensor 140 at a desired operating temperature. The CDG assembly includes an external thin-film (Kapton or other polyimide) heater 600, which is positioned on the outer surface 128 of the closed second end 114 of the vacuum enclosure 110 as sown in FIGS. 2, 4, and 15. The external heater is annular and has an inner diameter selected to fit around the third section 504 of the inlet tube 146 without engaging the outer surface of the third section. For example, in the illustrated embodiment, the external heater has an inner diameter of approximately 0.68 inch and an outer diameter of approximately 1.25 inch. The external heater has a gap 602 that allows the external heater to be installed around the inlet tube. A first heater wire 610 is electrically and mechanically secured to the external heater on one side of the gap. A second heater wire 612 is electrically and mechanically secured to the external heater on the other side of the gap. The two heater wires pass along the outside of the vacuum enclosure and are connected to an enclosure heater controller (not shown), which provides an electrical current to the external heater via the two heater wires. The external heater further includes a notch 620 along the inner circumference of the external heater in a location opposite to the gap. For example, the gap has a width of approximately 0.1 inch along the inner circumference and has a radial depth of approximately 0.125.

The external heater 600 is installed on the outer surface 128 of the second end 114 of the vacuum enclosure 110 by a suitable adhesive or other bonding material. The notch 620 of the external heater exposes a small area of the second surface. An external temperature sensor 630 is positioned in the exposed area of the second surface and is secured to the second surface by a suitable adhesive or other bonding material. In the illustrated embodiment, the external temperature sensor is also an RTD sensor similar to the previously described sensor. In the illustrated embodiment, the external temperature sensor is a two-wire RTD sensor. A first external sensor wire 632 and a second external sensor wire 634 extend along the outer surface of the vacuum enclosure from the external temperature sensor to an external heater controller 640 (shown schematically in FIG. 14) having a constant current source 642 and a voltage measuring system 644. The external heater controller operates in a conventional manner to apply a constant current to the resistance of the external temperature sensor and to measure the voltage developed across the external temperature. The measured voltage is responsive to the resistance of the external temperature sensor, which is responsive to the temperature of the external temperature sensor as previously described. The external heater controller varies the current applied to the external heater to control the vacuum enclosure temperature, which is measured by the external temperature sensor. The temperature is controlled at this location to be substantially the same temperature as the temperature of the sensor so as to produce an inlet tube differential temperature close to zero to thereby limit the amount of heat conducted out of the sensor via the inlet tube.

As discussed above, one of the goals of the CDG assembly 100 is to prevent excessive heat from reaching the electronics (not shown) that measure the varying capacitance of the CDG sensor 140. One potential source of heat transfer is through the material of the vacuum enclosure 110 from the second end 114 to the first end 112. Such heat can be transferred from the vacuum enclosure to the end cap 180 and then to the electronics. In the illustrated embodiment, the heat transfer from the second end to the first end of the vacuum enclosure is reduced by including a plurality of enclosure sections having reduced wall thicknesses. For example, the vacuum enclosure includes the reduced diameter portions 124, which are positioned circumferentially around the vacuum enclosure between the first end and the second end. In the illustrated embodiment, the vacuum enclosure has an overall length of approximately 2 inches from the first end to the second end. The second end and a portion of the cylindrical body extending from the first end to the second end have wall thicknesses of approximately 0.0625 inch. In contrast, each of the first and second circumferential sections has a wall thickness of approximately 0.036 inch. Each circumferential section extends for approximately 0.5 inch along the length of the vacuum enclosure. Thus, the circumferential sections reduce the wall thickness for approximately half the length of the vacuum enclosure. Furthermore, as described above, the end cap receiving portion 164 that forms the ledge 162 has a reduced wall thickness of approximately 0.031 inch, which further reduces the heat transfer to the end cap. In accordance with Fourier's law of heat conduction, the thinner wall sections produce resistance to thermal conduction and thus reduce the quantity of heat transferred to the end cap and ultimately transferred to the electronics (not shown).

As described above various cables are used to connect the CDG sensor 140, the temperature sensor 470, and the sensor heater 450. Because of the ultrahigh vacuum and the high operating temperatures conventional cables can exhibit outgassing of insulation materials into the cavity 116. In the illustrated embodiment, the various cables are insulated with a polyimide material such as Kapton®, which is commercially available from DuPont. Such polyimide materials exhibit extremely low outgassing and high temperature ratings. The material from any outgassing that may occur is easily removed by the getter assembly 270.

As discussed above, the vacuum enclosure 110 includes the mounting standoffs 130 that can be used to secure the vacuum enclosure to a support structure (not shown). In the illustrated embodiment, mounting screws (not shown) that engage the standoffs are preferably manufactured from a thermoplastic matter such as PEEK (polyetheretherketone). The thermoplastic screws have a low thermal conductivity, which assists in reducing heat transfer from the vacuum enclosure to the support structure.

As briefly discussed above, the coaxial feedthrough connectors 240, 242, 244 through the end cap 180 can be replaced with coaxial feedthrough connectors that can be bonded directly to the end cap. FIG. 16 illustrates an alternative end cap 700 that includes a first coaxial connector assembly 710, a second coaxial connector assembly 712, a third coaxial connector assembly 714 and a fourth coaxial connector assembly 716. The first, second, and third coaxial connector assemblies correspond to the previously described first, second and third coaxial connector assemblies and the elements of the connector assemblies are numbered accordingly. Unlike the previously described coaxial connector assemblies, each outer glass seal 252 of the coaxial connector assemblies of FIG. 16 is surrounded by a respective weldable cylindrical structure 720. In the illustrated embodiment, the weldable cylindrical structure has a thicker wall than the outer shields 250. The thicker wall facilitates the welding process. For example, the outer cylindrical structures are welded to the alternative end cap to form hermetic seals around each coaxial connector assembly.

The alternative end cap 700 includes the previously described getter assembly 270, the previously described evacuation tube 280 and the previously described ion gauge 290. Unlike the previously described end cap 180, the alternative end cap replaces the first sensor pin 300, the second sensor pin 302, the third sensor pin 304, and the fourth sensor pin 306 with the fourth coaxial connector assembly 716. The fourth coaxial connector assembly provides connections to a two-wire RTD (not shown) such as described in FIG. 13. If a four-wire RTD is used, an additional coaxial connector assembly (not shown) can be provided, or the alternative end cap can include the previously described four sensor pins.

In alternative embodiments, the wired connections between the end cap 180 and the sensor 140 may be replaced with spring-loaded contacts that automatically form the illustrated connections when the end cap is installed on the first end 112 of the vacuum enclosure 110. For example, one of the end cap and the sensor may have fixed pins extending toward the other of the end cap and the sensor. The other of the end cap and the sensor may have spring-like contacts positioned in alignment with the fixed pins. When the end cap is installed onto the vacuum enclosure, the pins press against the spring-like contacts to partially compress the spring-like contacts. The pressures produced by the spring-like contacts produce low-resistance engagements between the respective pins and the spring-like contacts to complete the illustrated interconnections between the end cap and the sensor.

This written description uses examples to disclose the invention and also to enable any person skilled in the art to practice the invention, including making and using any devices or systems. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Although embodiments of the disclosure have been described using specific terms, such description is for illustrative purposes only. The words used are words of description rather than limitation. It is to be understood that changes and variations may be made by those of ordinary skill in the art without departing from the spirit or the scope of the present disclosure, which is set forth in the following claims. In addition, it should be understood that aspects of the various embodiments may be interchanged in whole or in part. While specific uses for the subject matter of the disclosure have been exemplified, other uses are contemplated. Therefore, the spirit and scope of the appended claims should not be limited to the description of the versions contained herein.

What is claimed is:

1. A thermally controlled capacitance diaphragm gauge (CDG) sensor comprising:
    a CDG sensor; and
    a thermal control system for the CDG sensor having at least a first sensor signal wire and having a gas inlet tube, the gas inlet tube having an outer surface, the thermal control system comprising:
        a vacuum enclosure that includes a first end and a second end, the first end opening into a cavity in which the CDG sensor is mounted, the second end including a through bore passing into the cavity, the outer surface of the gas inlet tube hermetically sealed to the vacuum enclosure;

an end cap hermetically sealed to the first end of the vacuum enclosure to seal the cavity of the vacuum enclosure;

at least a first sensor signal connector passing through a first through bore of the end cap, the first sensor signal connector hermetically sealed to the end cap, the first sensor signal connector electrically connected to the first sensor signal wire;

an internal heater mounted to the CDG sensor within the vacuum enclosure, the internal heater having an internal heater cable;

a sensor heater connector passing through a second through bore of the end cap, the sensor heater connector hermetically sealed to the end cap, the sensor heater connector electrically connected to the internal heater cable;

an internal temperature sensor coupled to the CDG sensor, the internal temperature sensor having at least a first temperature sensor wire and a second temperature sensor wire;

at least a first temperature sensor connector electrically connected to the first temperature sensor wire and a second temperature sensor connector electrically connected to the second temperature sensor wire, the first temperature sensor connector passing through a third through bore of the end cap, the second temperature sensor connector passing through a fourth through bore of the end cap, the first and second temperature sensor connectors hermetically sealed to the end cap;

an evacuation tube passing through a fifth through bore of the end cap, the evacuation tube hermetically sealed to the end cap, the evacuation tube configured to enable gas to be removed from the cavity of the enclosure to form a vacuum insulator around the CDG sensor within the cavity; and an ion gauge positioned in a through bore of the end cap, the ion gauge hermetically sealed to the end cap, the ion gauge configured to detect the presence of gas molecules within the cavity of the vacuum enclosure.

2. The thermally controlled CDG sensor of claim 1 further including an external heater positioned on the closed second end of the vacuum enclosure proximate to the gas inlet tube.

3. The thermally controlled CDG sensor of claim 2 further including an enclosure temperature sensor positioned on the closed second end of the vacuum enclosure proximate to the external heater.

4. The thermally controlled CDG sensor of claim 1, wherein the internal temperature sensor is a two-wire resistance temperature detector (RTD).

5. The thermally controlled CDG sensor of claim 1, wherein the internal temperature sensor is a four-wire resistance temperature detector (RTD).

6. The thermally controlled CDG sensor of claim 1 further including a getter assembly positioned in a through bore of the end cap, the getter assembly hermetically sealed to the end cap, the getter assembly configured to remove contaminants from the cavity of the vacuum enclosure.

7. The thermally controlled CDG sensor of claim 1, wherein he first sensor signal wire comprises an ultrahigh vacuum coaxial cable.

8. The thermally controlled CDG sensor of claim 1, wherein the first sensor signal connector is hermetically sealed to the end cap by a glass seal.

9. The thermally controlled CDG sensor of claim 8, wherein:

the first sensor signal connector is a coaxial connector having a central signal pin and an outer shield;

the central pin of the coaxial connector is secured within the outer shield by an inner glass seal that electrically isolates the central pin from the outer shield and that provides a hermetic seal around the central pin; and the outer shield of the coaxial connector is secured to the end cap by an outer glass seal that electrically isolates the outer shield from the end cap and that provides a hermetic seal around the outer shield.

10. The thermally controlled CDG sensor of claim 8, wherein:

the first sensor signal connector is a coaxial connector having a central signal pin and an outer shield;

the central pin of the coaxial connector is secured within the outer shield by an inner glass seal that electrically isolates the central pin from the outer shield and that provides a hermetic seal around the central pin;

the outer shield of the coaxial connector is secured to a weldable cylindrical structure by an outer glass seal that electrically isolates the outer shield from the weldable cylindrical structure and that provides a hermetic seal around the outer shield; and the weldable cylindrical structure is welded to the end cap to form a hermetic seal between the end cap and the weldable cylindrical structure.

11. The thermally controlled CDG sensor of claim 1, wherein the CDG sensor has a second sensor wire, and wherein the thermal control system further includes a second sensor signal connector passing through a sixth through bore of the end cap, the second sensor signal connector hermetically sealed to the end cap, the second sensor signal connector electrically connected to the second sensor signal wire.

12. A method of maintaining a capacitance diaphragm gauge (CDG) sensor at an elevated operating temperature comprising:

positioning the CDG sensor having at least a first CDG sensor wire within a vacuum enclosure having a first end and a second end, the first end opening into a cavity in which the CDG sensor is mounted;

extending a gas inlet tube of the CDG sensor through the first end of the vacuum enclosure and hermetically sealing an outer surface of the gas inlet tube to the first end of the vacuum enclosure;

positioning an internal heater on at least one surface of the CDG sensor, the internal heater coupled to at least first and second current supply wires;

positioning a temperature sensor on the CDG sensor, the temperature sensor having a plurality of temperature sensor wires;

connecting the CDG sensor wire, the current supply wires and the temperature sensor wires to respective feedthrough connectors;

inserting the feedthrough connectors through an end cap and hermetically sealing the feedthrough connectors to the end cap;

positioning an ion gauge in a through bore of the end cap, the ion gauge hermetically sealed to the end cap, the ion gauge configured to detect the presence of gas molecules within the cavity of the vacuum enclosure;

hermetically sealing the end cap to the second end of the vacuum enclosure to form a gas-tight cavity within the vacuum enclosure; and evacuating the vacuum enclosure to reduce the pressure within the vacuum enclosure such that the reduced pressure within the vacuum enclosure form a thermally insulating barrier around the CDG sensor.

13. The method as defined in claim 12, wherein the temperature sensor is a resistance temperature detector (RTD) having at least two wires.

14. The method as defined in claim 13, wherein the RTD has four wires comprising two current carrying wires and two voltage measuring wires.

15. The method as defined in claim 12, wherein the feedthrough connectors are hermetically sealed to the end cap using glass seals.

16. The method as defined in claim 12, wherein the CDG sensor wire comprises an ultrahigh vacuum coaxial cable.

17. The method as defined in claim 12, wherein each of the heater current supply wires and each of the temperature sensor wires comprise an ultrahigh vacuum wire.

18. The method of claim 12, wherein:
the feedthrough connector connected to the CDG sensor wire is a coaxial connector having a central signal pin and an outer shield;
the central pin of the coaxial connector is secured within the outer shield by an inner glass seal that electrically isolates the central pin from the outer shield and that provides a hermetic seal around the central pin; and
the outer shield of the coaxial connector is secured to the end cap by an outer glass seal that electrically isolated the outer shield from the end cap and that provides a hermetic seal around the outer shield.

19. The method of claim 12, wherein:
the feedthrough connector connected to the CDG sensor wire is a coaxial connector having a central signal pin and an outer shield;
the central pin of the coaxial connector is secured within the outer shield by an inner glass seal that electrically isolates the central pin from the outer shield and that provides a hermetic seal around the central pin;
the outer shield of the coaxial connector is secured to a weldable cylindrical structure by an outer glass seal that electrically isolates the outer shield from weldable cylindrical structure and that provides a hermetic seal around the outer shield; and
the weldable cylindrical structure is welded to the end cap to form a hermetic seal between the end cap and the weldable cylindrical structure.

* * * * *

UNITED STATES PATENT AND TRADEMARK OFFICE
CERTIFICATE OF CORRECTION

PATENT NO. : 12,313,488 B2
APPLICATION NO. : 18/059845
DATED : May 27, 2025
INVENTOR(S) : Matt E. Datlen et al.

Page 1 of 1

It is certified that error appears in the above-identified patent and that said Letters Patent is hereby corrected as shown below:

In the Claims

In Claim 19 at Line 11 (Column 20 at Line 19), change "from weldable" to --from the weldable--.

Signed and Sealed this
First Day of July, 2025

Coke Morgan Stewart
*Acting Director of the United States Patent and Trademark Office*